US006404957B1

United States Patent
Shin et al.

(10) Patent No.: US 6,404,957 B1
(45) Date of Patent: Jun. 11, 2002

(54) OPTICAL POWER DIVIDER AND FABRICATION METHOD THEREOF

(75) Inventors: Sang-yung Shin, Seoul; Hyun-chae Song, Daejeon; Sang-yun Yi; Woo-hyuk Jang, both of Yongin; Tae-hyung Rhee, Bungnum, all of (KR)

(73) Assignee: Samsung Electronics, Co., Ltd., Suwon City (KR)

( * ) Notice: Subject to any disclaimer, the term of this patent is extended or adjusted under 35 U.S.C. 154(b) by 0 days.

(21) Appl. No.: 09/186,358

(22) Filed: Nov. 5, 1998

(30) Foreign Application Priority Data

Nov. 5, 1997 (KR) .............................................. 97-58240

(51) Int. Cl.⁷ .............................. G02B 6/26; G02B 6/42
(52) U.S. Cl. ................................ 385/45; 385/48; 385/14
(58) Field of Search .............................. 385/45, 46, 48, 385/28, 29, 14

(56) References Cited

U.S. PATENT DOCUMENTS

| 3,453,036 A | * | 7/1969 | Swope et al. ............... 385/39 |
| 5,138,687 A |   | 8/1992 | Horie et al. ................ 385/129 |

FOREIGN PATENT DOCUMENTS

| JP | 56-126809 | 10/1981 |
| JP | 62-62304 | 3/1987 |
| JP | 62-136611 | 6/1987 |
| JP | 63-60407 | 3/1988 |
| JP | 63-63007 | 3/1988 |
| JP | 63-77009 | 4/1988 |
| JP | 3-185405 | 8/1991 |
| JP | 4-172308 | 6/1992 |
| JP | 4-260006 | 9/1992 |
| JP | 5-11130 | 1/1993 |
| JP | 8-327836 | 12/1996 |
| JP | 11-64657 | 3/1999 |
| WO | WO 97/32228 | 9/1997 |

OTHER PUBLICATIONS

Electronics Letters vol. 24, No. 22, Oct. 27, 1988, W Y Hung et al., "Single–mode 1×3 integrated optical branching circuit design using phase–front accelerators", pp. 1365–1366, especially Fig. 1.

Electronics Letters vol. 30, No. 5, Mar. 3, 1994, H B Lin et al., "Singlemode 1×3 integrated optical branching circuit design using microprism", pp. 408–409, especially Figs. 1 and 3.

(List continued on next page.)

Primary Examiner—Cassandra Spyrou
Assistant Examiner—Leo Boutsikaris
(74) Attorney, Agent, or Firm—Robert E. Bushnell, Esq.

(57) ABSTRACT

An optical power divider using a beam separator and a beam expander, and a fabrication method therefor. The optical power divider includes an input optical waveguide having an input port for receiving incident light, for guiding the light incident via the input port, a plurality of output optical waveguides having at least two output ports, for outputting the light incident via the input optical waveguide to the output ports, wherein the number of output optical waveguides is equal to that of the output ports, and a beam separator located at a branch area in which the light incident on the input optical waveguide diverges toward the output optical waveguides, the beam separator being made of a material having a refractive index lower than the core of the input and output optical waveguides, for separating the light to the output optical waveguides with a predetermined ratio. Therefore, the length of the optical power divider becomes short and insertion loss can be lowered. Also, an optical power divider for the special application, providing different splitting ratios between inner and outer output ports, can be easily designed by controlling the lengths of a side of each beam separator and beam expanders, and the splitting ratio of the output optical power of the optical power divider can be controlled. Also, the cost of fabricating the optical power divider can be reduced.

24 Claims, 5 Drawing Sheets

OTHER PUBLICATIONS

"Novel Passive Multibranch Power Splitters For Integrated Optics", Weissman et al., Applied Optics US, Optical Society of America, Washington, vol. 29, No. 30, pp 4426–4428, Oct. 20, 1990.

"Low Loss Wide–Angle Symmetric Y–Branch Waveguide", Chan et al., Electronics Letters, GB, IEE Stevenage, vol. 32 No. 7, pp 652–654, Mar. 28, 1996.

"Glass Waveguide 1XN Branching Devices", Ichiro et al., IEICE transactions On Communications, JP, Institute Of Electronics Information And Comm. Eng. Tokyo, vol. E75–B, No. 9, pp 886–892, Sep. 9, 1992.

"Single–Mode 1×3 Integrated Optical Branching Circuit Design Using Phase–Front Accelerators", Electronics Letters, GB, IEE Stevenage, vol. 24, No. 22, pp 1365–1366, Oct. 27, 1988.

"Polymer Optical Couplers For Applications In Multi–Chip Modules", Ni et al., Proceedings Of The IEEE Multi–Chip Module conference, US Los Alamitos, *IEEE Comp. Soc. Press,* vol. Conf. 5, pp 178–181, Jun. 2, 1996.

* cited by examiner

Y-TYPE BRANCHED OPTICAL WAVEGUIDE

OPTICAL POWER DIVIDER AND FABRICATION METHOD THEREOF

CLAIM OF PRIORITY

This application makes reference to, incorporates the same herein, and claims all benefits accruing under 35 U.S.C §119 from an application entitled Optical Power Divider And Fabrication Method Thereof earlier filed in the Korean Industrial Property Office on Nov. 5, 1998, and there duly assigned Serial No. 97-58240 by that Office.

BACKGROUND OF THE INVENTION

1. Field of the Invention

The present invention relates to an optical power divider, and more particularly, to an optical power divider using a beam separator and a beam expander, and a method for fabricating the same.

2. Description of the Related Art

In general, an optical power divider is for distributing incident light among a plurality of regions. The optical power divider can be applied to various fields such as an optical communications system or an optical access network, and is a basic element used for optical communications. The optical power divider may be classified according to the number of output ports, into 1×2, 1×4, 1×8, ..., 1×N types, where $N=2^m$ and m is a natural number. The light is usually output to each output port with a uniform ratio. However, a splitting ratio at each port may be different for a special application. As shown in FIGS. 1A and 1B, the optical power divider is expanded by connecting Y-type branched optical waveguides each having two output ports in series and parallel to each other, like a tree. That is, the 1×4 type optical power divider of FIG. 1A is formed by connecting three 1×2 Y-type branched optical waveguides in series and parallel to each other, and the 1×8 type optical power divider of FIG. 1B is obtained by connecting seven 1×2 Y-type branched optical waveguides in series and parallel to each other.

Assuming that the optical power divider is expanded by the above manner, more serial connections are required as the number of output ports increases. Thus, the length of a 1×4 branched optical waveguide or a 1×8 branched optical waveguide is two or three times the length of the 1×2 branched optical waveguide. In addition, as the length of an optical power divider increases, propagation loss of the light also increases. Here, we have determined that the length of the Y-type branched optical waveguide can be reduced by increasing a branch angle within the structure of the optical waveguide. We have also determined, however, that such an increase in the branch angle increases radiation loss at a branch area, so that decreasing the length of the branched optical waveguide has limitations. Thus, in order to increase the branch angle while maintaining the radiation loss at a minimum, a branch area has been designed to have a specific structure [H. P. Chan and P. S. Chung, Electron Lett., vol. 32, pp. 652–654, 1996], and a microprism structure has been inserted in a branch area [H. B. Lin, R. S. Cheng and W. S. Wang, IEEE Photon. Technol. Lett., vol. 6, pp. 825–827, 1994].

SUMMARY OF THE INVENTION

To solve the above problems, it is an object of the present invention to provide an optical power divider adopting a beam separator and beam expanders such that additional loss does not occur and such that the length of the optical power divider does not increase when output ports of the optical power divider are expanded.

It is another object of the present invention to provide a method for fabricating the optical power divider.

According to an aspect of the first object, there is provided an optical power divider comprising: an input optical waveguide having an input port for receiving incident light, for guiding the light incident via the input port; a plurality of output optical waveguides having at least two output ports, for outputting the light incident via the input optical waveguide to the output ports, wherein the number of output optical waveguides is equal to one less than the number of the output ports; and a beam separator located at a branch area in which the light incident on the input optical waveguide diverges toward the output optical waveguides, the beam separator being made of a material having a refractive index lower than the core of the input and output optical waveguides, for separating the light to the output optical waveguides with a predetermined ratio.

Preferably, the optical power divider further comprises beam expanders located near the outer sides of the branch area in which the light incident on the input optical waveguide diverges toward the output optical waveguides, the beam expander being made of a material having a refractive index higher than the cladding region of the input and output optical waveguides, for dividing the light to be output uniformly to the output ports.

Preferably, the beam separator has a triangular shape, and the light output to the output ports is separated in a predetermined ratio according to the refractive index, and the height and the length of a side of the triangle.

According to another aspect of the first object, there is provided an optical power divider comprising: an input optical waveguide having an input port for receiving incident light, for guiding the light incident via the input port; a plurality of output optical waveguides having at least two output ports, for outputting the light incident via the input optical waveguide to the output ports, wherein the number of output optical waveguides is equal to that of the output ports, and beam expanders located near the outer sides of the branch area in which the light incident on the input optical waveguide diverges toward the output optical waveguides, the beam expander being made of a material having a refractive index higher than the cladding region of the input and output optical waveguides, for dividing the light to be output uniformly to the output ports.

Preferably, the beam expander has a triangular shape, and the light output to the output ports is separated in a predetermined ratio according to the refractive index, and the height and the length of a side of the triangle.

According to still another aspect of the first object, there is provided an 1×4 optical power divider comprising: an input optical waveguide having an input port for receiving incident light, for guiding the light incident via the input port; four output optical waveguides having four output ports, for outputting the light incident via the input optical waveguide to the output ports; a beam separator located at the point of symmetry between upper and lower regions of the branch area in which the light incident on the input optical waveguide diverges toward the four output optical waveguides, with a triangular shape, the beam separator being made of a material having a refractive index lower than the core of the input and output optical waveguides, for separating the light to the output optical waveguides with a predetermined ratio according to the refractive index, and the height and the length of a side of the triangle; and beam expanders located near the outer sides of the branch area in which the light incident on the input optical waveguide diverges toward the output optical waveguides, the beam expander being made of a material having a refractive index higher than the cladding region of the input and output optical waveguides, for dividing the light to be output uniformly to the output ports according to the refractive index, and the height and the length of a side of the triangle.

Preferably, the refractive index of the beam separator is the same as that of the cladding region of the input and output optical waveguides, and the refractive index of the beam expander is the same as that of the core of the input and output optical waveguides.

Preferably, branch angle between the four output optical waveguides are the same.

Preferably, assuming that the four output optical waveguides are called first, second, third and fourth output optical waveguides from the top, and there are an imaginary line AA' parallel to the width of the input optical waveguide and passing through a crossing point b between the inner sides of the first and fourth output optical waveguides, and an imaginary line BB' parallel to the width of the input optical waveguide and passing through a crossing point c between the inner sides of the second and third output optical waveguides, the beam separator is located at the center of a branch area between the imaginary lines AA' and BB' and the beam separator has an isosceles-triangular shape having the point c as the center point of the base and the point b as the crossing point between the legs of the triangle with equal length.

Preferably, the beam expanders are located near the outer sides of the first and fourth output optical waveguides between the imaginary lines AA' and BB', with a triangular shape, a side of the triangle is a part of the imaginary line BB', and a crossing point of the triangle is located on the imaginary line AA'.

Preferably, assuming that the four output optical waveguides are called first, second, third and fourth output optical waveguides from the top, and there are an imaginary line AA' parallel to the width of the input optical waveguide and passing through a crossing point b between the inner sides of the first and fourth output optical waveguides, and an imaginary line BB' parallel to the width of the input optical waveguide and passing through a crossing point c between the inner sides of the second and third output optical waveguides, the beam separator is located at the symmetry center between upper and lower region of a branch area between the imaginary lines AA' and BB' and the beam separator has an isosceles-triangular shape having the point b as the crossing point between the legs of the triangle with equal length, and the height greater than the interval between the imaginary lines AA' and BB'.

Preferably, the beam expanders are located near the outer sides of the first and fourth output optical waveguides between the imaginary lines AA' and BB', with a triangular shape, a crossing point of the triangle is located on the imaginary line AA', and the height of the triangle is greater than the interval between the imaginary lines AA' and BB'.

Preferably, the beam separator is located at the center of the branch area between the imaginary lines AA' and BB', has an isosceles-triangular shape having the point c as the center of the base and the point b as the crossing point between the legs of the triangle with equal length, and the interval between the second and third output optical waveguides on the imaginary line BB' is equal to the length of the base of the triangular beam separator.

According to an aspect of the second object, there is provided a method for fabricating an optical power divider including an input optical waveguide for guiding an incident light, at least two output optical waveguides for guiding the incident light passed through the input optical waveguide, a beam separator for separating the incident light, the beam separator being located at a branch area in which the incident light via the input optical waveguide diverges to the output optical waveguides and made of a material having a refractive index lower than that of the core of the input and output optical waveguides, and beam expanders for expanding the incident light, the beam expanders being located near the outer sides of the branch area in which the incident light via the input optical waveguide diverges to the output optical waveguides and made of a material having a refractive index higher than that of the cladding region of the input and output optical waveguides, the method comprising the steps of: (a) forming a thin film as a lower clad, on a substrate; (b) growing a thin film as a core, on the thin film formed in step (a), having a refractive index higher than the thin film of step (a); (c) selectively etching the resultant of step (b) to form the structure of the optical power divider; and (d) growing an upper clad on the resultant of step (c).

Preferably, the substrate is formed of a material selected from the group consisting of Si, GaAs and InP, and the lower clad, the core and the upper clad are formed as semiconductor thin films.

Preferably, the substrate is formed of silicon or fused silica, and the lower clad, the core and the upper clad are formed of silica or polymer.

According to another aspect of the second object, there is provided a method for fabricating an optical power divider, comprising the steps of: (a) forming a core layer on a ferroelectric substrate, having a refractive index higher than the ferroelectric; (b) etching the resultant of the step (a) to form the structure of the optical power divider; and (c) forming an upper cladding layer on the optical waveguide formed in the step (b).

According to still another aspect of the second object, there is provided a method for fabricating an optical power divider, comprising the steps of: (a) forming an optical waveguide on a ferroelectric substrate, by increasing a refractive index of a predetermined region in the structure of the ferroelectric substrate; and (b) forming an upper clad layer on the optical waveguide.

Preferably, the ferroelectric is $LiNbO_3$ or $LiTaO_3$.

Preferably, the refractive index is increased by a proton exchange method for substituting hydrogen ions for lithium ions within the ferroelectric substrate, or by in-diffusing a metal thin film.

Preferably, the metal thin film is a titanium thin film or a nickel thin film, and the upper clad layer is a silica thin film or an alumina thin film.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

An optical power divider according to the present invention includes an input optical waveguide, a plurality of output optical waveguides, a beam separator and beam expanders. The input optical waveguide includes an input port through which light is incident and guides the incident light. The plurality of output optical waveguides include at least two output ports and output the light input through the input optical waveguide to the output ports.

The beam separator is located at a branch area with a triangular shape, in which the light incident through the input waveguide diverges to the plurality of output optical waveguides. The beam separator is formed of a material having a refractive index lower than that of the core of the input and output optical waveguides, and the light output to the output optical waveguide is separated in a predetermined ratio. Here, the separation ratio of the light output to the output ports is determined according to the refractive index of the beam separator and the height and length of the base of the triangle.

The beam expanders are located near the outer sides of the branch area with a triangular shape. Also, the beam expander is formed of a material having a refractive index higher than that of the cladding region of the input and output optical waveguides, and expands the light incident to the input optical waveguide to be output to the output ports in a predetermined ratio. Here, the separation ratio of the light output to the output ports varies according to the refractive index of the beam expander and the height and length of the base of each triangle.

Hereinafter, the basic idea of the present invention will be described prior to the detailed explanation of the optical power divider. The basic idea of the present invention is that the separation ratio of the light to be output is controlled by the beam separator and the beam expander when the incident light guided by the input optical waveguide is output to at least two or more output optical waveguides. That is, when the light incident to one input optical waveguide diverges to a plurality of output optical waveguides, the concentration of light at the center when the incident light diverges can be moderated by installing the beam separator having a refractive index lower than the core of the input and output optical waveguides at the branch area. Also, the light can diverge outward instead of being concentrated at the center when the light diverges toward the plurality of output optical waveguides, by installing the beam expander having a refractive index higher than that of the cladding region of the input and output optical waveguides, near the outer sides of the branch area. Thus, either the beam separator or the beam expander may be used according to the number of output optical waveguides and the refractive index of the output optical waveguides.

Figure 1A:
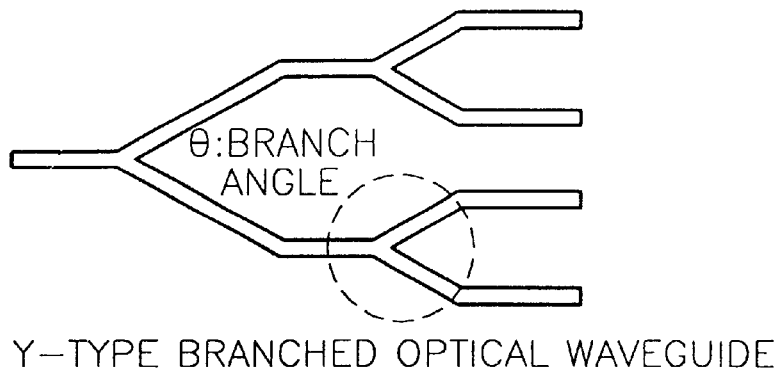
FIG. 1A shows a conventional 1×4 optical power divider.
Figure 1B:
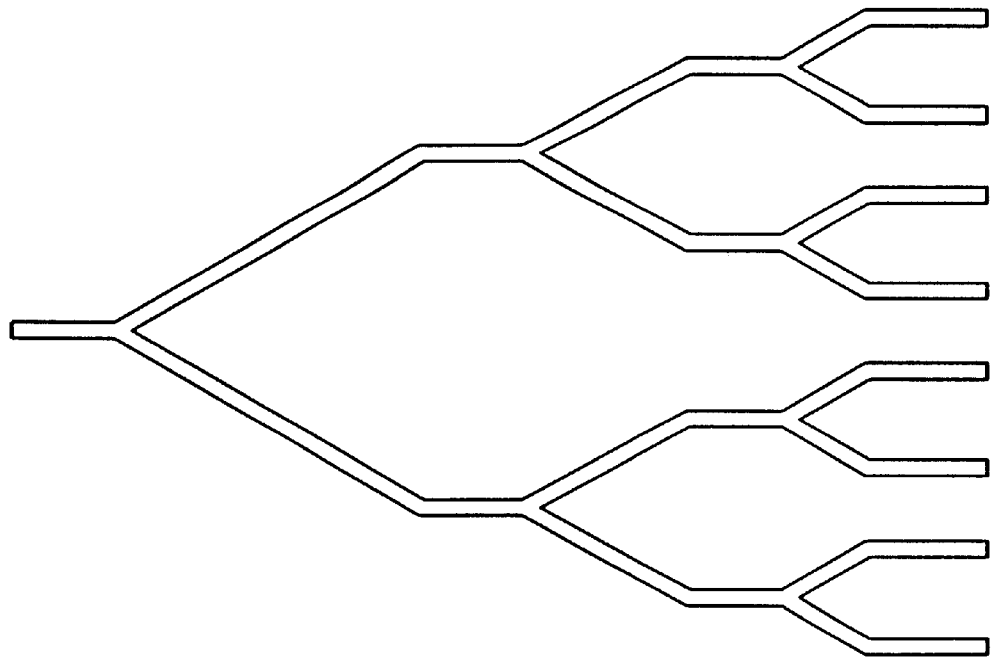
FIG. 1B shows a conventional 1×8 optical power divider.
Figure 2:
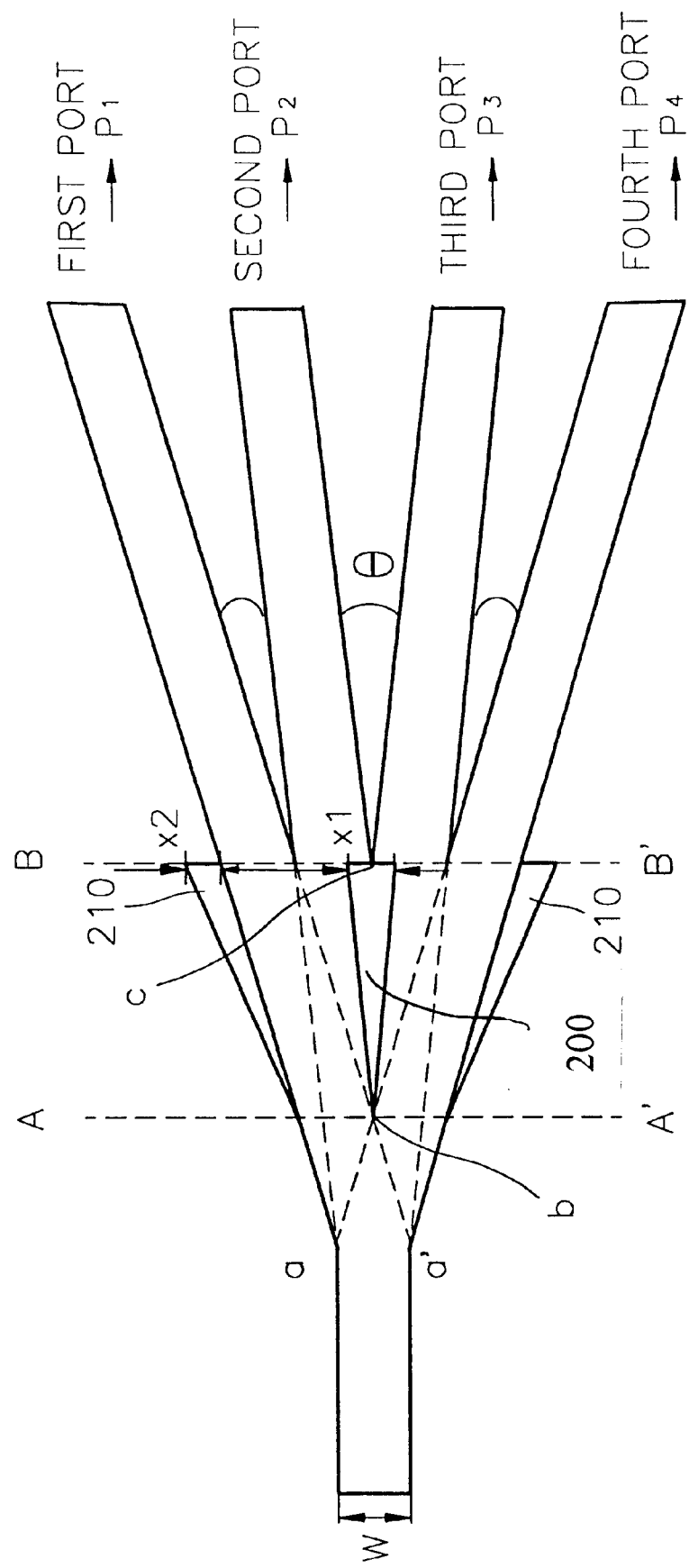
FIG. 2 shows the basic structure of a 1×4 optical power divider adopting an expanded Y-type branched optical waveguide according to a first embodiment of the present invention.

FIG. 2 shows the basic structure of a 1×4 optical power divider according to a preferred embodiment of the present invention, which is obtained by adding two optical waveguides above and below the conventional Y-type branched optical waveguide.

The conventional Y-type branched optical waveguide (1×2 optical power divider) is obtained by connecting two optical waveguides of equal width, i.e., second and third ports $P_2$ and $P_3$, to the end aa' of a single mode straight optical waveguide having a width w, having a branch angle of θ therebetween. Also, another two optical waveguides, i.e., first and fourth ports $P_1$ and $P_4$, are attached above and below the second and third ports of the Y-type branched optical waveguide, having an angle of 3θ therebetween based on the end aa', resulting in a 4-way branched optical waveguide. Here, the branch angle between adjacent optical waveguides is equal to θ as shown in, FIG. 2. Here, it is assumed that there are an imaginary line AA' passing through a crossing point b between the inner sides of the added first and fourth ports $P_1$ and $P_4$, which is vertical with respect to the light traveling direction, and an imaginary line BB' passing through a crossing point c between the inner sides of the second and third ports $P_2$ and $P_3$, which is vertical with respect to the light traveling direction. The triangular structures respectively called the beam separator 200 and the beam expander 210 are inserted in the branch area between the imaginary lines AA' and BB'.

The beam separator 200 is an isosceles triangle having a base whose length is ×1, which is located at the center of the branch area. The refractive index of the beam separator 200 is equal to that of the cladding region which is not part of the optical waveguide. Also, the beam expanders 210 are symmetrically located at either side of the branch area, with a triangular shape having a side whose length is ×2, and has a refractive index which is equal to that of the core region of the optical waveguide. That is, the beam separator 200 and the beam expanders 210 are arranged to have a structure similar to the structure of the branch area with a trapezoidal shape, enclosed by the two imaginary lines AA' and BB', divided along an imaginary line bc and then the space between the two divided parts is increased by a predetermined branch angle.

Figure 3:
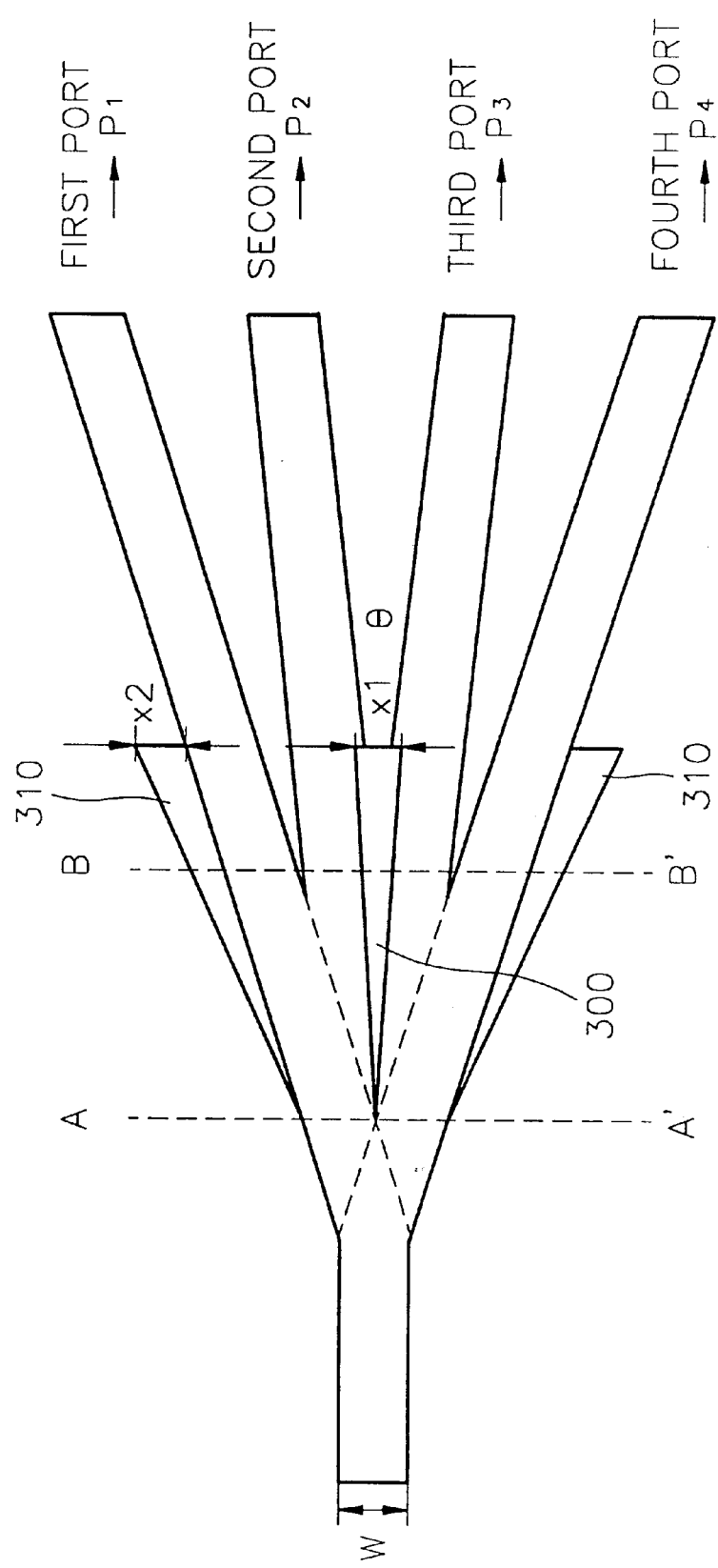
FIG. 3 shows a 1×4 optical power divider according to a second embodiment of the present invention.
Figure 4:
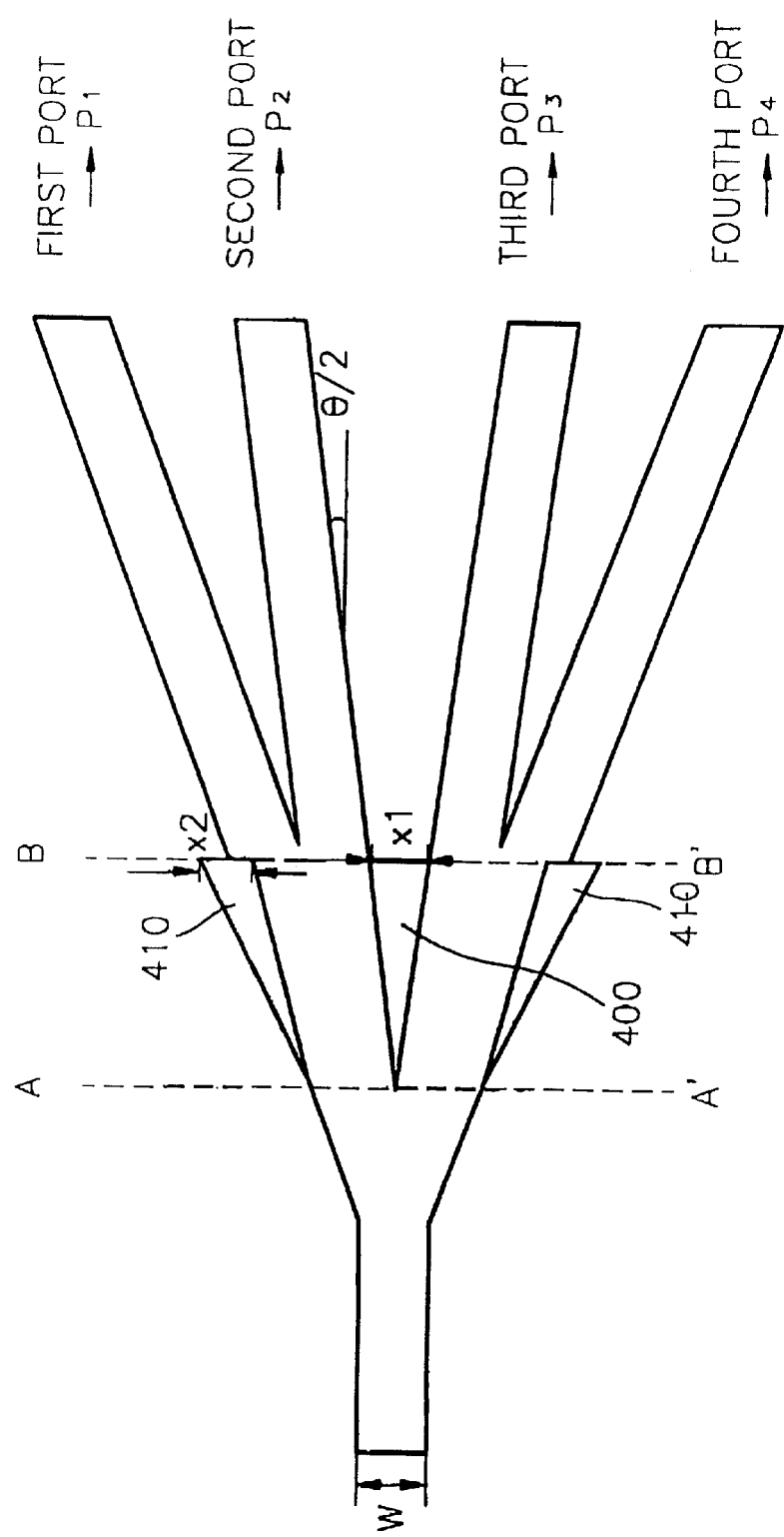
FIG. 4 shows a 1×4 optical power divider according to a third embodiment of the present invention.

FIGS. 3 and 4 show example modifications of the 1×4 optical power divider shown in FIG. 2. Here, the output ports are expanded using the beam separator and the beam expanders without changing the length of the optical power divider. The example of FIG. 3 has the same structure as the optical power divider of FIG. 2, except that a beam separator 300 and beam expanders 310 are elongated past the imaginary line BB' along the light traveling direction. Also, the modified optical power divider of FIG. 3 operates according to the same operating principle as that of FIG. 2. However, in the modified optical power divider of FIG. 3, the number of pointed edges of the wedges formed among each port is reduced by eliminating the crossing point c between the second and third ports $P_2$ and $P_3$, such that the optical power divider can be easily manufactured. FIG. 4 shows another optical power divider modified from the optical power divider of FIG. 2. According to the structure of the optical power divider of FIG. 4, the second and third ports $P_2$ and $P_3$, are diverged as much as the length×1 of a beam separator 400, such that the number of pointed edges of the wedges is reduced, thereby providing the same advantages as in the structure of FIG. 3.

The operation of the 1×4 optical power divider of FIG. 2 will be described. First, if there are no beam separators and no beam expanders, the light incident via the input port gathers at the inner output ports (second and third ports $P_2$ and $P_3$) having a small branch angle. Thus, due to the symmetrical structure of the optical power device according to the present invention, the inner output ports (second and third ports $P_2$ and $P_3$) have strong light intensity compared to the outer output ports (first and fourth ports $P_1$ and $P_4$). However, the beam separator 200 having a base whose length is ×1 and the beam expanders 210 having a side whose length is ×2 separate the input light evenly among the four output ports $P_1$, $P_2$, $P_3$ and $P_4$. In detail, the beam separator 200 evenly separates the input light around a branch point, to the second and third ports $P_2$ and $P_3$, and the beam expanders 210 expand the separated input lights outward in order to prevent the separated input lights from gathering around the inner output ports (second and third ports $P_2$ and $P_3$). As a result, the input light is output uniformly via the inner and outer output ports. The appropriate lengths ×1 and ×2 of each side of the beam separator and the beam expander are varied according to the size of guided mode of the waveguided light and the branch angle. If the branch angle is small, the uniform output characteristics can be obtained by using either the beam separator or the beam expander.

Figure 5A:
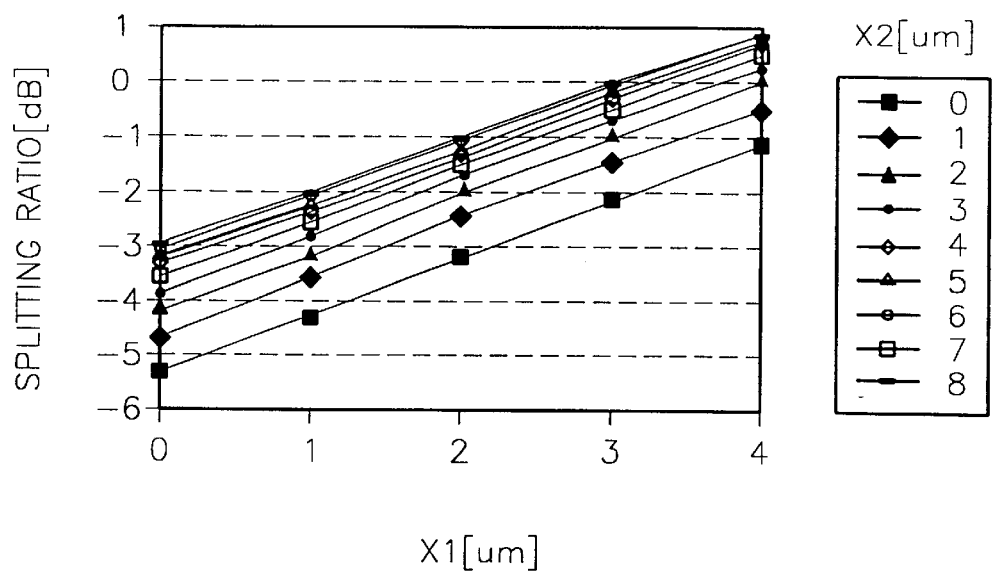
FIG. 5A is a graph showing the optical power splitting ratio according to the lengths ×1 and ×2 of a beam separator and a beam expander according to the present invention.
Figure 5B:
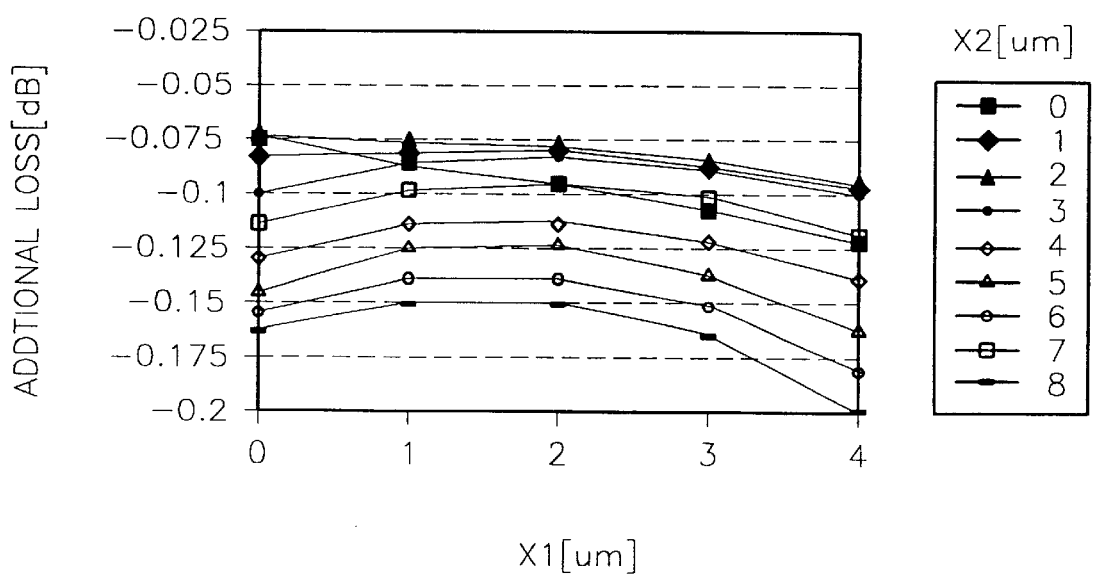
FIG. 5B is a graph showing additional loss according to the lengths ×1 and ×2 of the beam separator and the beam expander according to the present invention.

In order to design the 1×4 optical power divider having the structure of FIG. 2, an optical waveguide device was analyzed by a 2-dimensional finite difference beam propagation method. For numerical simulation, parameters were set as follows: the width w of the channel optical waveguide was 6 $\mu$m, the branch angle $\theta$ was 1°, effective refractive indexes $N_{clad}$ and $N_{core}$ of the cladding and core were 1.5248 and 1.5276, respectively. The optical power output to each outer (first and fourth ports $P_1$ and $P_4$) and inner (second and third ports $P_2$ and $P_3$) output ports, according to the lengths ×1 and ×2 of each beam separator and beam expander, are expressed as a logarithmic splitting ratio (unit: dB) in FIG. 5A, which was obtained by $10 \times Log_{10}(P_{1,4}/P_{2,3})$. As shown in FIG. SA, when the lengths ×1 and ×2 of the beam separator and the beam expander are appropriate, the light can be uniformly output to each output port. Also, the ratio of the output optical power can be set to a predetermined value for a special application, based on the result of the numerical simulation. FIG. 5B shows the additional loss according to the lengths ×1 and ×2 of the beam separator and the beam expander, expressed as a logarithmic value (unit: dB) obtained by $10 \times Log_{10}(P_1+P_2+P_3+P_4)$. As shown in FIG. 5B, the shorter the length ×2 of the beam expander is, the lower the additional loss is. Also, the additional loss according to the above range of lengths of the beam separator and the beam expander, for the uniform output light, is comparatively less to a range of −0.09~−0.17 dB.

Next, a method for fabricating the optical power divider according to the present invention will be described. The optical power divider can be formed of various materials by various methods. First, a semiconductor such as Si, GaAs or InP can be used as a material for the substrate of an optical waveguide. A semiconductor thin film to be used as a lower clad is formed on the semiconductor substrate, and then a core as a semiconductor thin film having a slightly high refractive index is grown thereon. Then, after forming the structure of the optical power divider through wet- or dry-etching, a semiconductor film to be used as an upper clad is grown thereon, resulting in an optical power divider.

Also, ferroelectrics such as $LiNbO_3$ or $LiTaO_3$ may be used as a material for the substrate. When such ferroelectric is used, the substrate itself can be used as a lower clad without forming a lower clad on the substrate. The optical waveguide is obtained by forming a core having a refractive index higher than that of the substrate over the entire surface of the substrate and then by wet- or dry-etching the resultant structure. However, a method for fabricating an optical waveguide by increasing a refractive index in a part of the substrate to be the optical waveguide is preferred. For example, a proton exchange method of increasing a refractive index by substituting hydrogen ions for lithium (Li) ions within the substrate, or a method of increasing a refractive index through in-diffusion of a metal thin film such as titanium (Ti) or nickel (Ni). The optical waveguide fabricated by this method has a graded index profile rather than a step index profile which is the profile of a semiconductor optical waveguide fabricated by the former method. After forming the optical waveguide, air may be used as the upper clad without forming an extra upper clad on a core. However, silica ($SiO_2$) or alumina ($Al_2O_3$) thin film may be used as the upper clad.

Also, another optical power divider may be fabricated using a plurality of silica or polymer thin films formed on a silicon or fused silica substrate. The fabrication method therefor is similar to the method in which a semiconductor substrate is used for fabricating an optical power divider. That is, first, a lower cladding layer is formed on a substrate, and then a core layer having a refractive index higher than the cladding layer is formed. The core layer is selectively etched such that the region to be an optical waveguide remains, and then an upper cladding layer is formed on the resultant structure, resulting in an optical power divider.

In the optical power divider and the fabrication method therefor according to the present invention, the length of the optical power divider is reduced. When expanding a 1×2 optical power divider into a 1×4 optical power divider, the Y-type branched optical waveguides should be connected in series in 2 stages in the conventional method while the method of the present invention expands only one 1×2 branched optical waveguide to obtain the 1×4 optical power divider. Thus, the length of the 1×4 optical power divider according to the present invention is shorter than the conventional 1×4 optical power divider.

That is, unlike the conventional method in which a 1×4 optical power divider is obtained by connecting 1×2 optical power dividers in series and parallel, the 1×4 optical power divider of the present invention is fabricated by adding two optical waveguides to both outer sides of the 1×2 optical power divider. Thus, the length of the 1×4 optical power divider of the present invention is shorter than the conventional optical power divider. If a 1×N optical power divider is formed by connecting the 1×4 optical power dividers as a unit divider in series and parallel, the length of the 1×N optical power divider can be markedly reduced. For example, a 1×16 optical power divider can be simply fabricated by connecting five 1×4 optical power dividers in series and parallel in two stages according to the present invention. Meanwhile, fifteen 1×2 optical power dividers must be connected in series and parallel in four stages in the conventional method, thereby complicating the structure of the end optical power divider and increasing the length thereof.

Second, insertion loss (propagation loss and radiation loss) can be lowered. Because the optical power divider according to the present invention is short, propagation loss of light while passing through the optical waveguide is less than the conventional optical powder divider. Also, the number of branch areas and branch points is reduced, thereby decreasing radiation loss. That is, because the propagation loss occurring when the light passes through the optical waveguide, and the radiation loss at the branch points are less, the overall insertion loss of the optical power divider decreases. When light goes through a branch point of the Y-type branched optical waveguide, undesirable mode coupling occurs at the branch point, so that the light is partially radiated, thereby causing light loss. Assuming that a 1×4 optical power divider is fabricated, the conventional method causes two branch points on a path between input and output ports to the 1×4 optical power divider while a 1×4 optical power divider according to the present invention has only one branch point. Thus, radiation loss is decreased compared to the conventional optical power divider.

Third, an optical power divider for the special application, providing different splitting ratios between the inner and outer output ports, can be easily designed by controlling the lengths of the beam separator and the beam expander. That is, in the 1×4 optical power divider having the beam separator and the beam expander according to the present invention, the splitting ratio of the optical power can be appropriately tuned for the purpose of the divider by controlling the size of the beam separator and the beam expander, thereby widening the application field of the optical power divider.

Fourth, the cost of fabricating the optical power divider can be reduced. Because the optical power divider according to the present invention is shorter than the conventional one, many dividers can be integrated on the same substrate, thereby reducing fabrication cost. In general, attention is required to forming a branch area without error, where the optical waveguide diverges. The optical power divider according to the present invention has only one branch area which is also less than the conventional one so that the optical power divider according to the present invention is comparatively immune to various defects caused by dust or impurities of a thin film, which may occur during the fabrication process. Thus, yield as well as quality of the optical waveguide device can be increased, thereby lowering the cost of fabrication.

What is claimed is:

1. An optical power divider including:
    an input port;
    first, second, third and fourth output ports;
    a single branching area;
    an input optical waveguide coupling said input port to said branching area;
    first, second, third and fourth output optical waveguides coupling said branching area to said first, second, third and fourth output ports, respectively;
    a beam separator, centrally disposed within said branching area, for evenly separating light, input via said input port and said input optical waveguide, around a branch point and towards said second and third output optical waveguides; and
    first and second beam expanders disposed along opposite outer sides of said branch area for expanding the light, separated by said beam separator, outward to prevent the separated light from gathering around the second and third output ports, the separated and expanded light being uniformly output through said first, second, third and fourth output ports via said first, second, third and fourth output optical waveguides.

2. The optical power divider as set forth in claim 1, further including:
    each of said input and output optical waveguides having a core, each core being of equal refractive index; and
    the said beam separator being made of a material having a refractive index lower than the refractive index of each core.

3. The optical power divider as set forth in claim 1, further including:
    first and second cladding layers each having a same predetermined refractive index; and
    said beam expanders being made of a material having a refractive index higher than the refractive index of said cladding layers.

4. The optical power divider as set forth in claim 2, further including:
    first and second cladding layers each having a same predetermined refractive index; and
    said beam expanders being made of a material having a refractive index higher than the refractive index of said cladding layers.

5. The optical power divider as set forth in claim 1, said beam separator having an isosceles triangular shape, and the light is separated in a predetermined ratio according to a refractive index of the beam separator, a height of the beam separator and a length of a base of the beam separator.

6. The optical power divider as set forth in claim 1, further including:
    first and second cladding layers each having a same predetermined refractive index; and
    said the beam separator being made of a material having a refractive index equal to the refractive index of the cladding layers.

7. The optical power divider as set forth in claim 1, further including:
    each of said input and output optical waveguides having a core, each core being of equal refractive index; and
    said beam expanders being made of a material having a refractive index equal to the refractive index of the cores.

8. The optical power divider as set forth in claim 1, said beam expanders each having a triangular shape, and the light output to the output ports is diverged in a predetermined ratio according to the refractive index of the beam expanders, the height of the beam expanders and the length of one side of the beam expanders.

9. An optical power divider having an input port and first, second, third and fourth output ports for uniformly outputting light input via said input port, said optical power divider including:
    a substrate;
    a first thin film cladding layer formed on said substrate, said first thin film cladding layer having a first refractive index;
    a core formed of a material having a second refractive index; said core comprising:
        a single branching area;
        an input optical waveguide coupling said input port to said branching area; and
        first, second, third and fourth output optical waveguides coupling said branching area to said first, second, third and fourth output ports, respectively;
    a beam separator, disposed within said branching area, for evenly separating light, input via said input port and said input optical waveguide, around a branch point and towards said second and third output optical waveguides;
    first and second beam expanders disposed along opposite outer sides of said branch area for expanding the light, separated by said beam separator, outward to prevent the separated light from gathering around the second and third output ports, the separated and expanded light being uniformly output through said first, second, third and fourth output ports via said first, second, third and fourth output optical waveguides; and a second thin film cladding layer formed over said first thin film cladding layer, said core, said beam separator and said beam expanders, said second thin film cladding layer having said first refractive index.

10. The optical power divider as set forth in claim 9, further including said the beam separator being made of a material having a refractive index lower than the second refractive index.

11. The optical power divider as set forth in claim 9, further including said beam expanders being made of a material having a refractive index higher than the first refractive index.

12. The optical power divider as set forth in claim 10, further including said beam expanders being made of a material having a refractive index higher than the first refractive index.

13. The optical power divider as set forth in claim 9, said beam separator having an isosceles triangular shape, and the light is separated in a predetermined ratio according to a refractive index of the beam separator, a height of the beam separator and a length of a base of the beam separator.

14. The optical power divider as set forth in claim 9, further including said the beam separator being made of a material having a refractive index equal to the first refractive index.

15. The optical power divider as set forth in claim 9, further including said beam expanders being made of a material having a refractive index equal to the second refractive index.

16. The optical power divider as set forth in claim 9, said beam expanders each having a triangular shape, and the light output to the output ports is diverged in a predetermined ratio according to a refractive index of the beam expanders, a height of the beam expanders and a length of one side of the beam expanders.

17. An optical power divider having an input port and at least four output ports for uniformly outputting light input via said input port, said optical power divider comprising:

a substrate;

a first thin film cladding layer formed on said substrate, said first thin film cladding layer having a first refractive index;

a core formed of a material having a second refractive index; said core comprising at least:
 a single branching area;
 an input optical waveguide coupling said input port to said branching area; and
 first, second, third and fourth output optical waveguides coupling said branching area to first, second, third and fourth output ports, respectively;

a beam separator, disposed within said branching area, for evenly separating light, input via said input port and said input optical waveguide, around a branch point and towards said second and third output optical waveguides;

first and second beam expanders disposed along opposite outer sides of said branch area for expanding the light, separated by said beam separator, outward to prevent the separated light from gathering around the second and third output ports, the separated and expanded light being uniformly output through said first, second, third and fourth output ports via said first, second, third and fourth output optical waveguides; and a second thin film cladding layer formed over said first thin film cladding layer, said core, said beam separator and said beam expanders, said second thin film cladding layer having said first refractive index.

18. The optical power divider as set forth in claim 17, further comprising said the beam separator being made of a material having a refractive index lower than the second refractive index.

19. The optical power divider as set forth in claim 17, further comprising said beam expanders being made of a material having a refractive index higher than the first refractive index.

20. The optical power divider as set forth in claim 18, further comprising said beam expanders being made of a material having a refractive index higher than the first refractive index.

21. The optical power divider as set forth in claim 17, said beam separator having an isosceles triangular shape, and the light is separated in a predetermined ratio according to a refractive index of the beam separator, a height of the beam separator and a length of a base of the beam separator.

22. The optical power divider as set forth in claim 17, further comprising said the beam separator being made of a material having a refractive index equal to the first refractive index.

23. The optical power divider as set forth in claim 17, further comprising said beam expanders being made of a material having a refractive index equal to the second refractive index.

24. The optical power divider as set forth in claim 17, said beam expanders each having a triangular shape, and the light output to the output ports is diverged in a predetermined ratio according to a refractive index of the beam expanders, a height of the beam expanders and a length of one side of the beam expanders.

* * * * *